US009822823B2

(12) United States Patent
Wingerter et al.

(10) Patent No.: US 9,822,823 B2
(45) Date of Patent: Nov. 21, 2017

(54) DRIVE SHAFT ASSEMBLY

(71) Applicant: Ironside, LLC, Conroe, TX (US)

(72) Inventors: Jack Wingerter, Shenandoah, TX (US); Rodney Wingerter, Shenandoah, TX (US)

(73) Assignee: IRONSIDE, LLC, Conroe, TX (US)

( * ) Notice: Subject to any disclaimer, the term of this patent is extended or adjusted under 35 U.S.C. 154(b) by 58 days.

(21) Appl. No.: 14/882,277

(22) Filed: Oct. 13, 2015

(65) Prior Publication Data
US 2016/0333940 A1 Nov. 17, 2016

Related U.S. Application Data

(63) Continuation of application No. PCT/US2015/030430, filed on May 12, 2015.

(51) Int. Cl.
*E21B 4/00* (2006.01)
*F16D 3/221* (2006.01)
*E21B 4/02* (2006.01)
*F16D 3/84* (2006.01)

(52) U.S. Cl.
CPC ............... *F16D 3/221* (2013.01); *E21B 4/006* (2013.01); *E21B 4/02* (2013.01); *F16D 3/84* (2013.01); *F16D 3/845* (2013.01)

(58) Field of Classification Search
CPC . F16D 3/02; F16D 3/221; F16D 3/843; E21B 4/02; E21B 4/006
USPC ........................................ 464/139-141, 155
See application file for complete search history.

(56) References Cited

U.S. PATENT DOCUMENTS

| 6,949,025 B1 | 9/2005 | Kraus et al. |
| 8,408,557 B2 * | 4/2013 | Taylor .................... F16J 15/062 |
| 2011/0005839 A1 * | 1/2011 | Marchand ................. E21B 4/02 |

OTHER PUBLICATIONS

International Search Report of the International Searching Authority (USPTO) for international application PCT/US2015/030430 dated Aug. 11, 2015.
Written Opinion of the International Searching Authority (USPTO) for international application PCT/US2015/030430 dated Aug. 11, 2015.

* cited by examiner

*Primary Examiner* — Gregory J Binda
(74) *Attorney, Agent, or Firm* — Basil M. Angelo; Angelo Mikeska PLLC

(57) ABSTRACT

A drive shaft assembly includes a drive shaft that includes a first cylindrical end having a first diameter, a cylindrical portion having a second diameter, and a second cylindrical end having the first diameter. A first distal end of the drive shaft includes a first distal spherical indentation. A first adapter cap includes a first tapered inner aperture and a first seal disposed within a first groove formed in a circumference of the first tapered inner aperture. The first tapered inner aperture is configured to receive the first cylindrical end of the drive shaft and the first seal forms a seal with the cylindrical portion of the drive shaft having the second diameter. A first adapter includes a first distal spherical indentation. A first distal spherical ball is removably attached to the first distal spherical indentation.

17 Claims, 17 Drawing Sheets

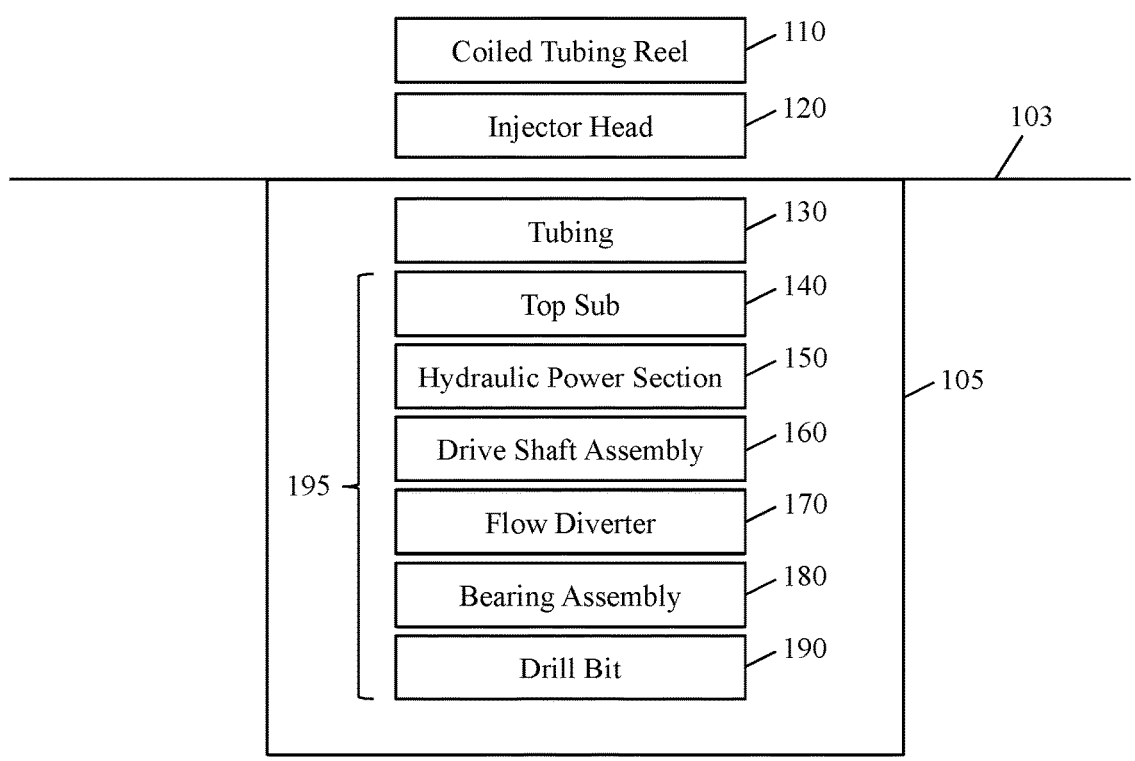
PRIOR ART
FIG. 1

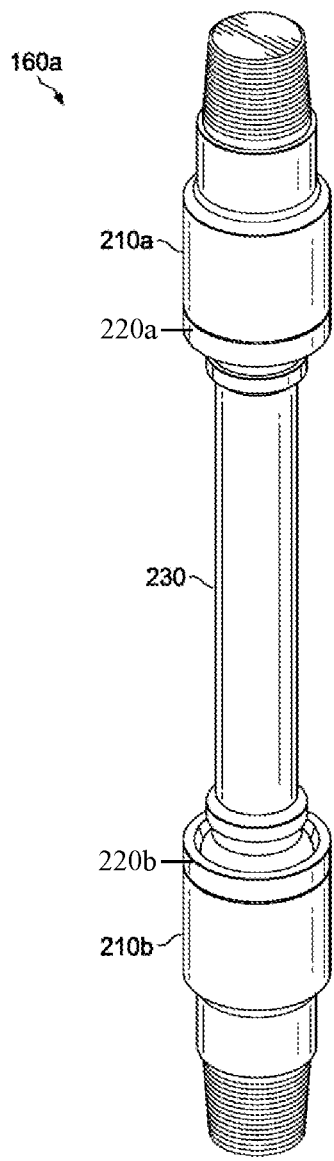
PRIOR ART
FIG. 2A

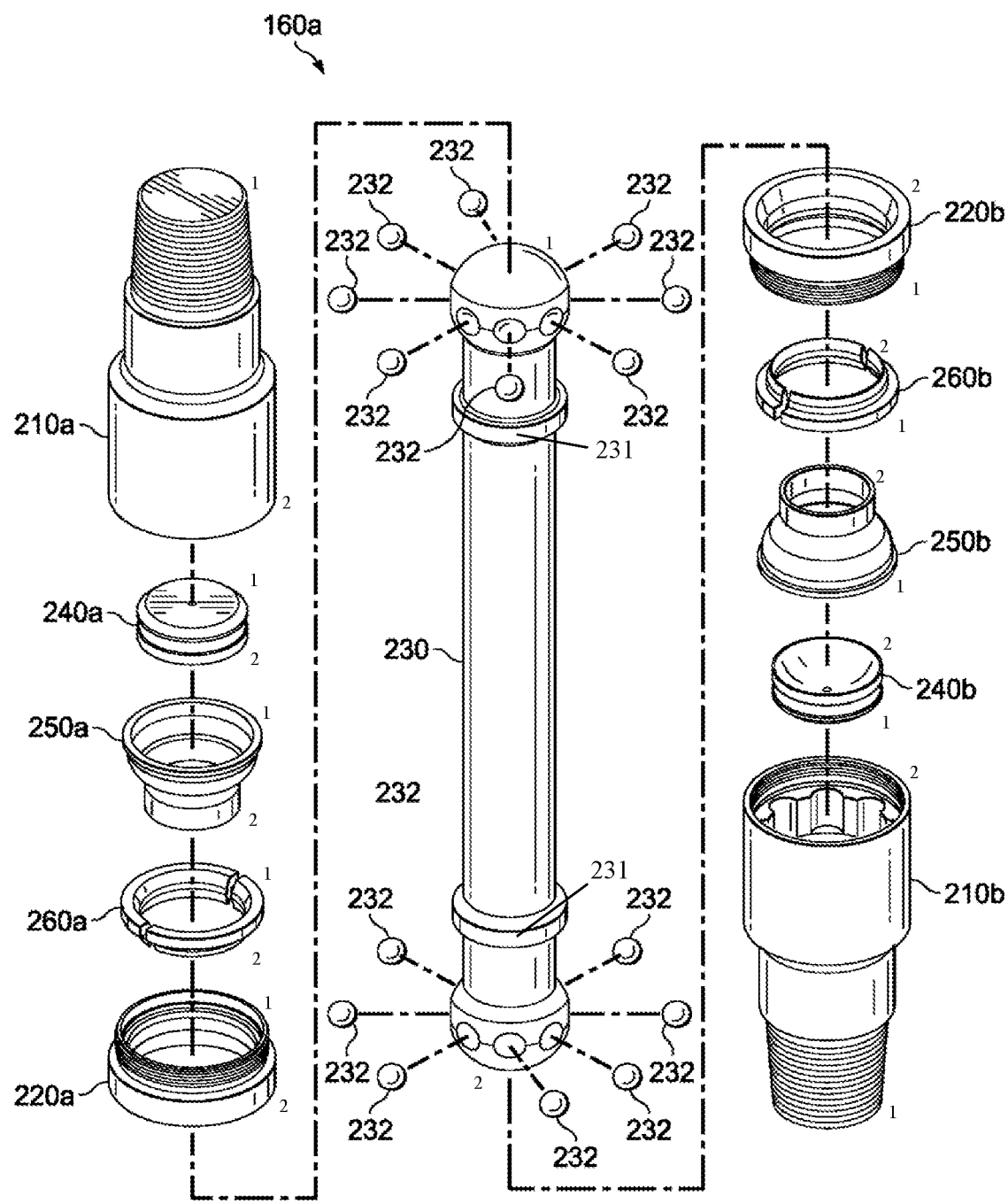
PRIOR ART
FIG. 2B

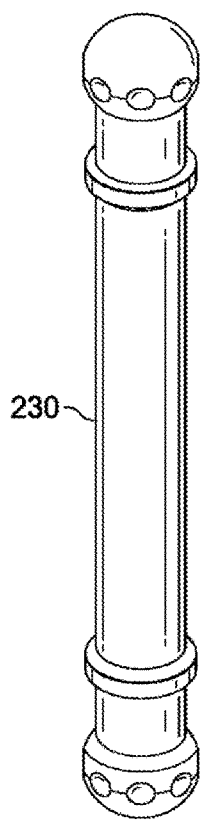 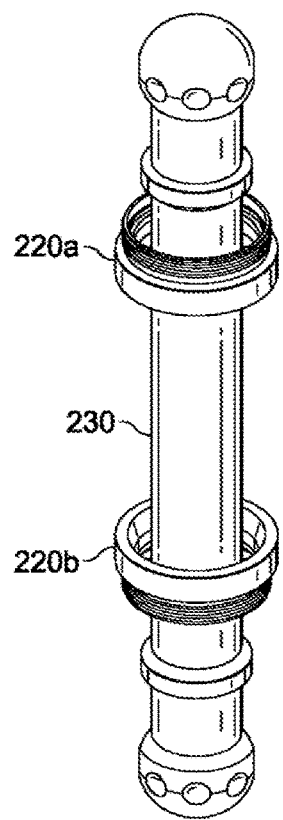 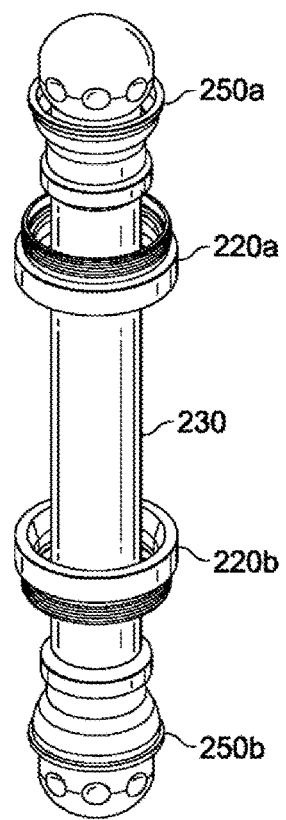
PRIOR ART
FIG. 3A
PRIOR ART
FIG. 3B
PRIOR ART
FIG. 3C

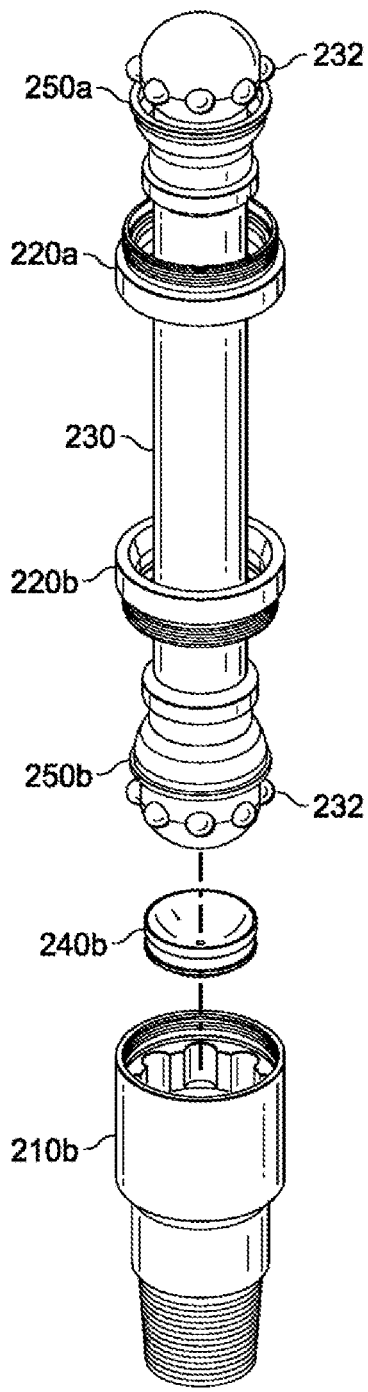
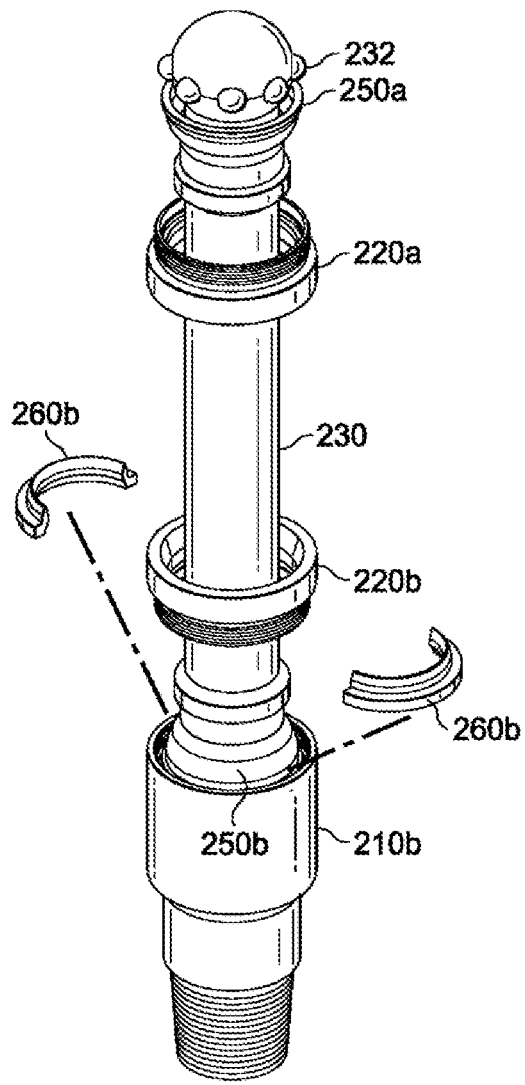
PRIOR ART
FIG. 3D
PRIOR ART
FIG. 3E

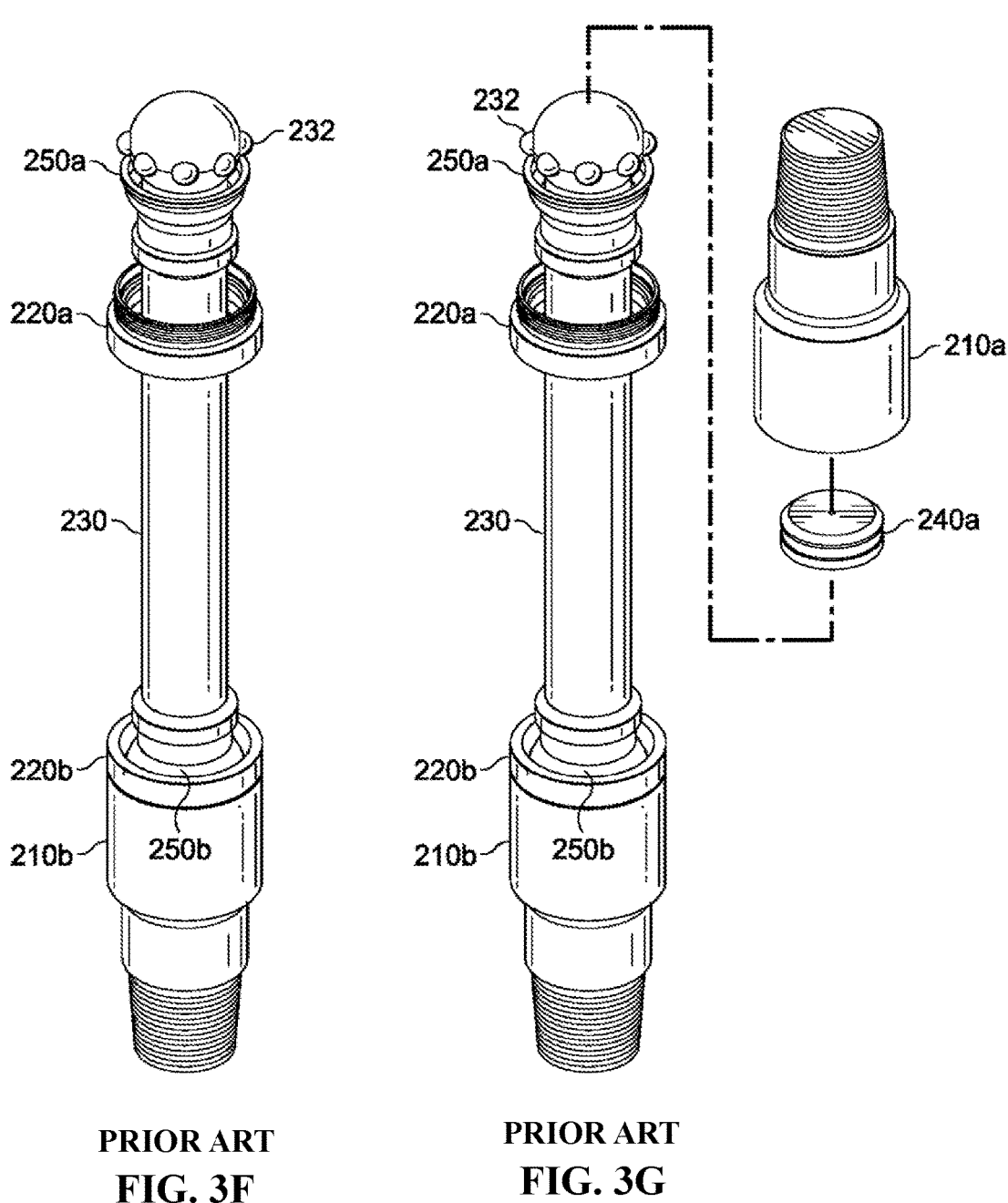
PRIOR ART
FIG. 3F
PRIOR ART
FIG. 3G

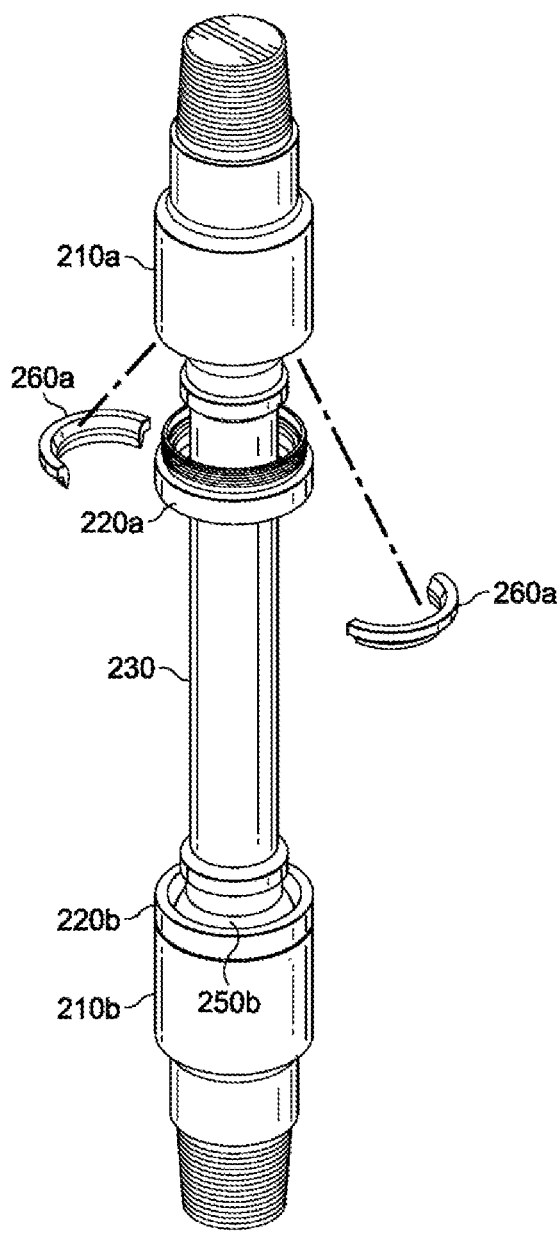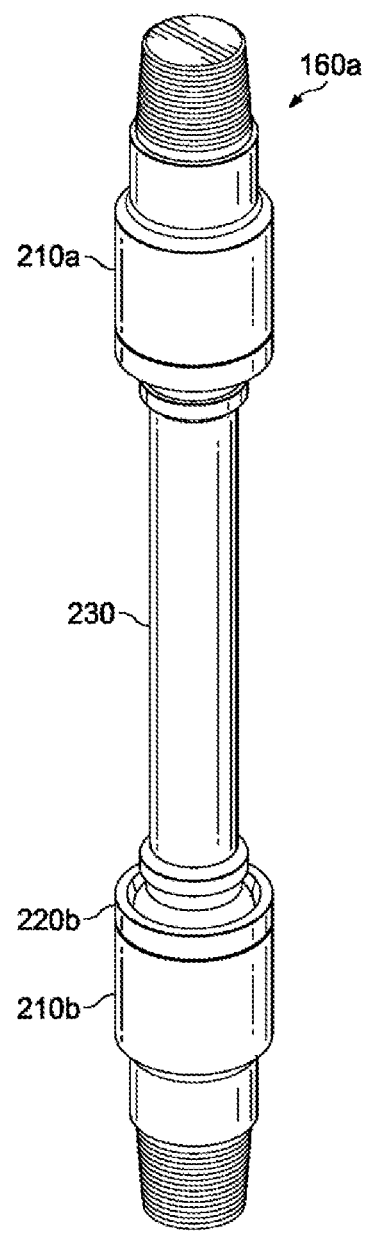
PRIOR ART
FIG. 3H
PRIOR ART
FIG. 3I

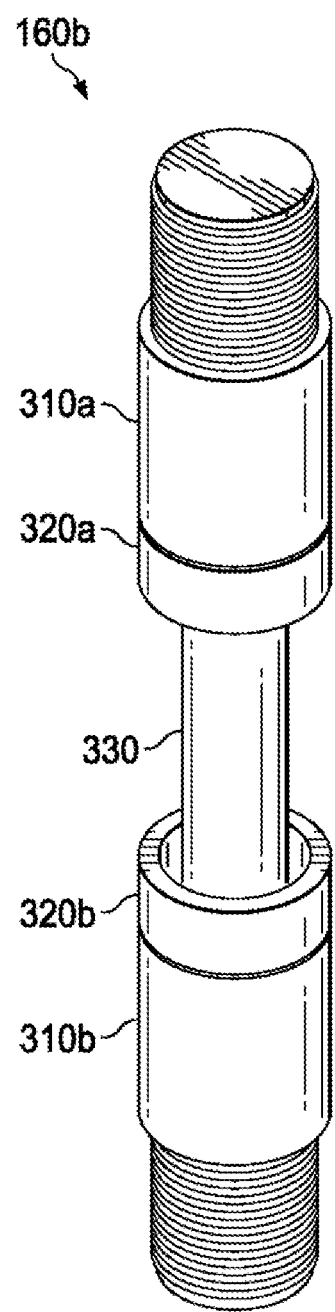
FIG. 4A

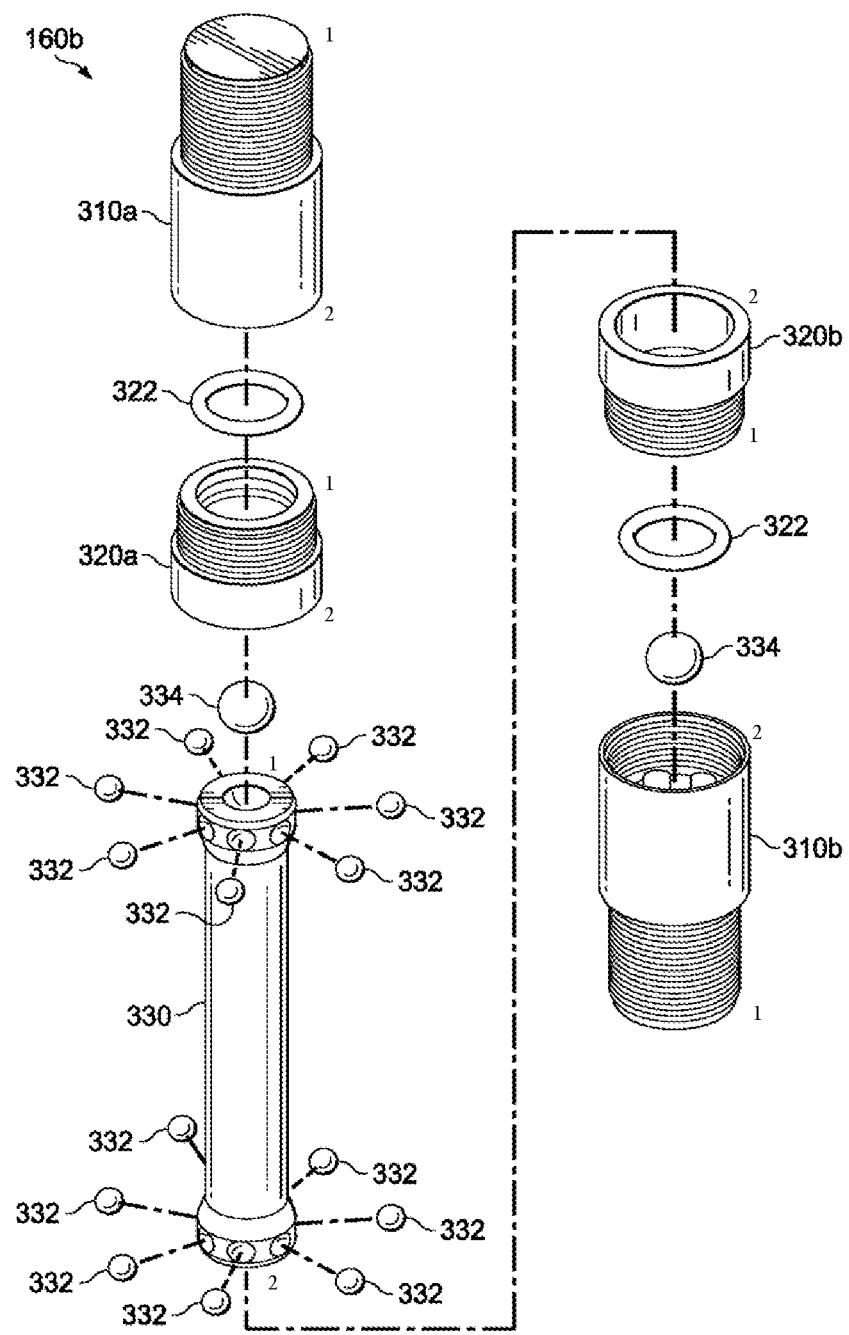
FIG. 4B

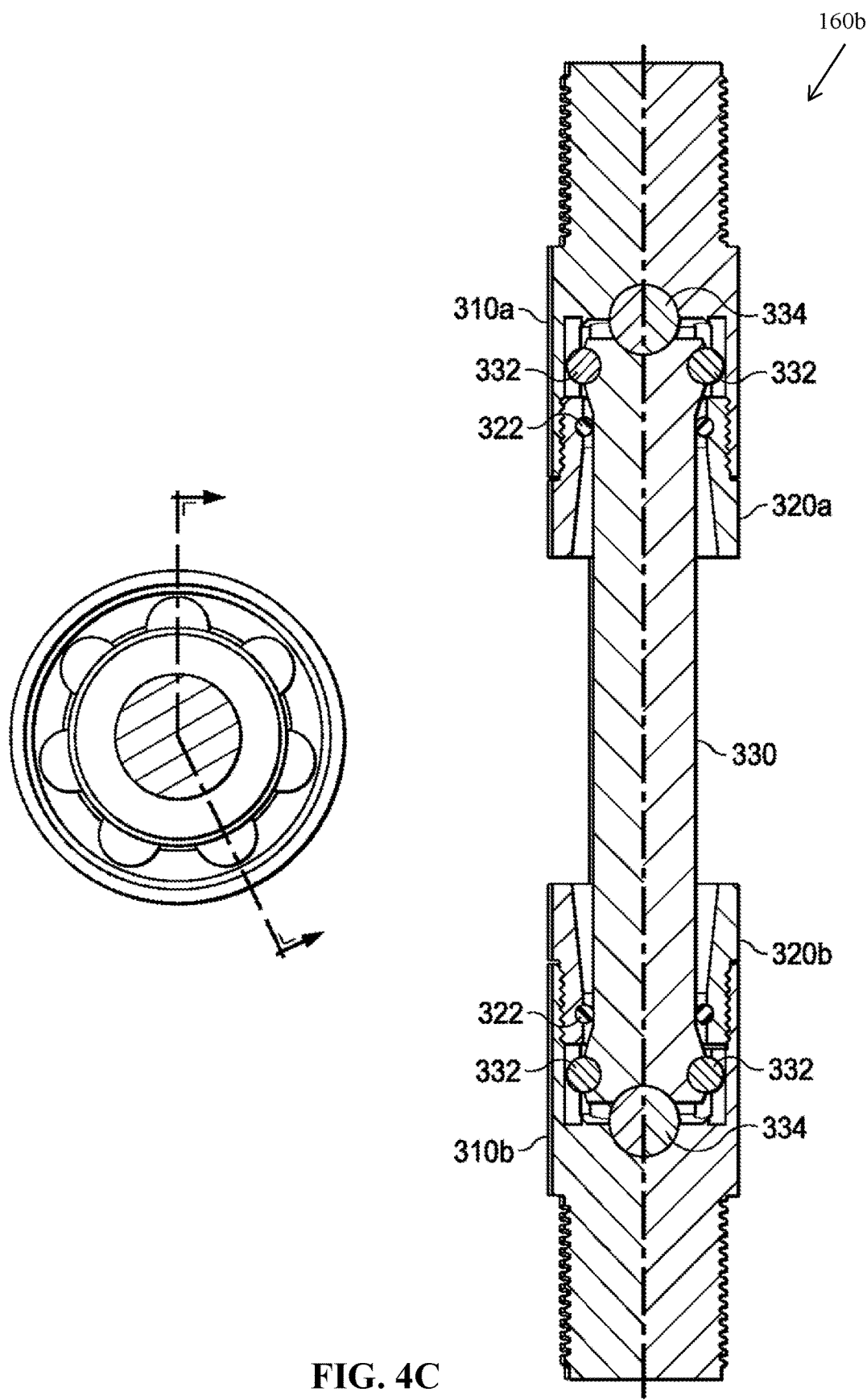
FIG. 4C

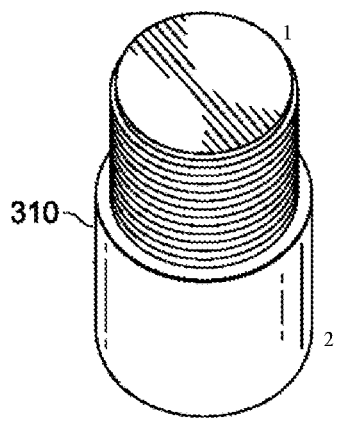
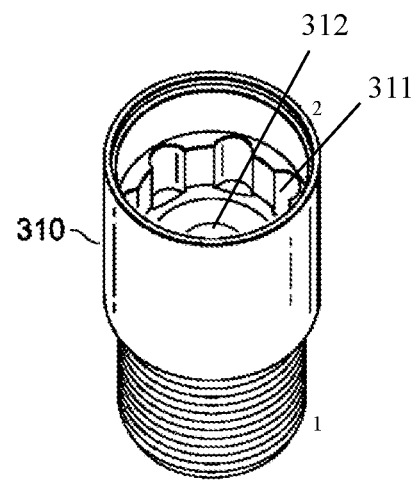
FIG. 5A  FIG. 5B
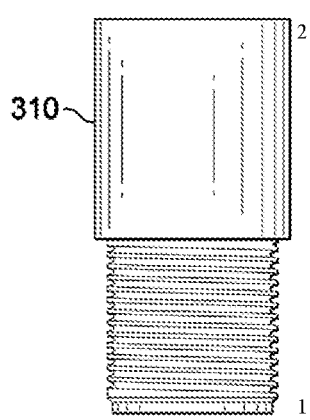
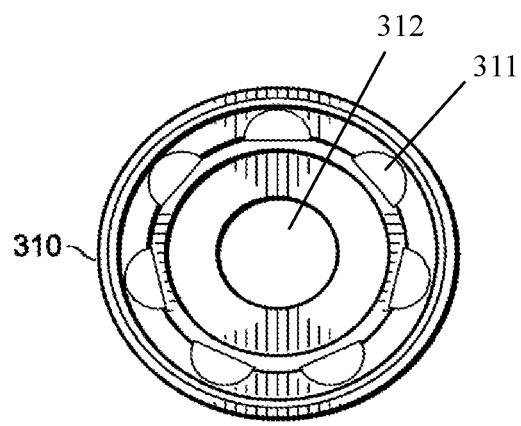
FIG. 5C  FIG. 5D

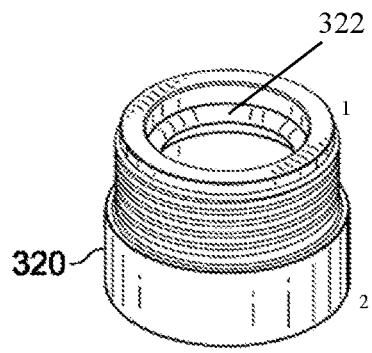
FIG. 6A
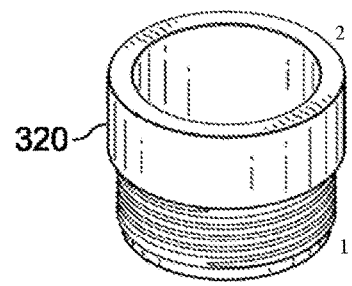
FIG. 6B
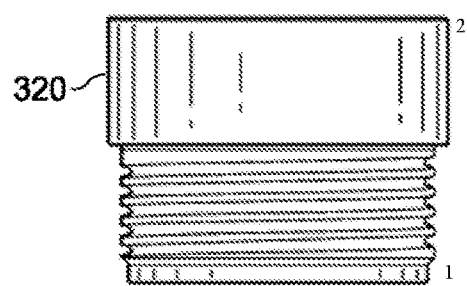
FIG. 6C
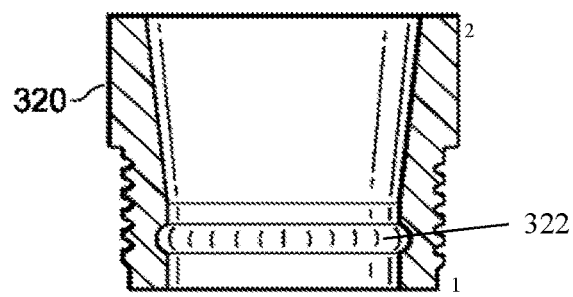
FIG. 6D

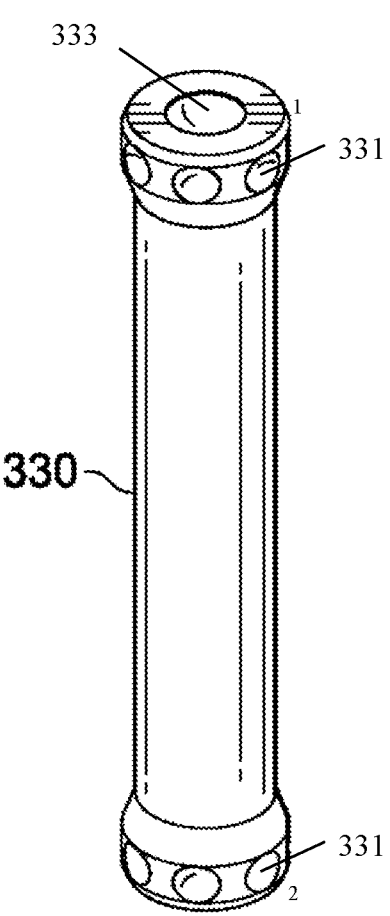
FIG. 7A
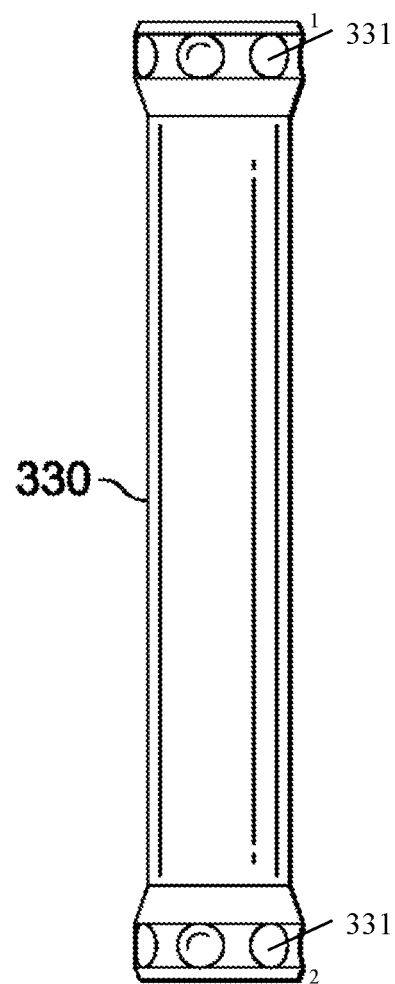
FIG. 7B
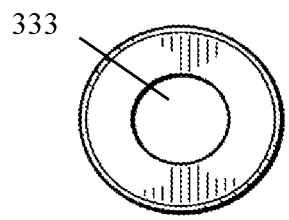
FIG. 7C
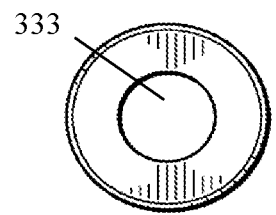
FIG. 7D

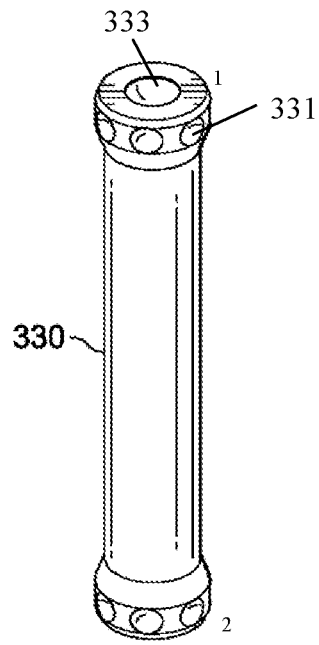
FIG. 8A
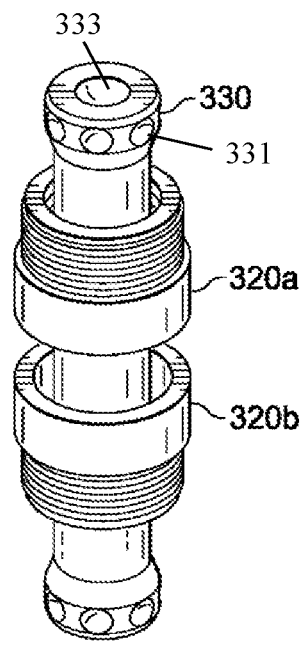
FIG. 8B
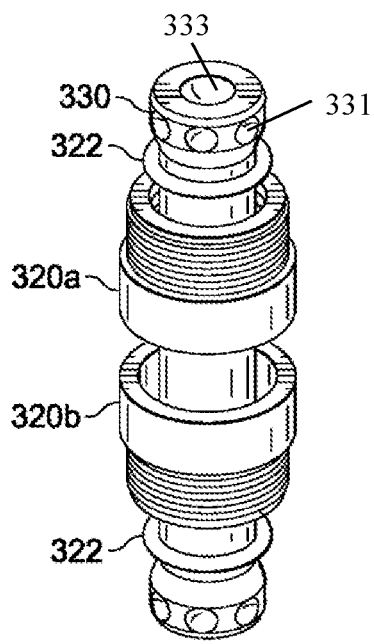
FIG. 8C
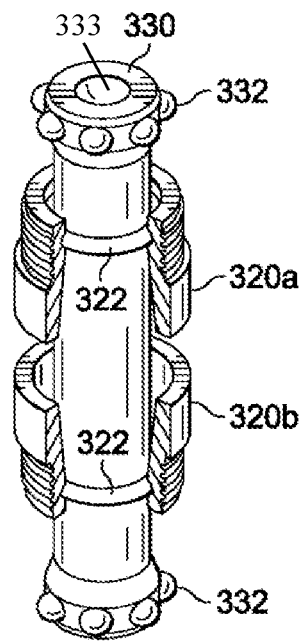
FIG. 8D

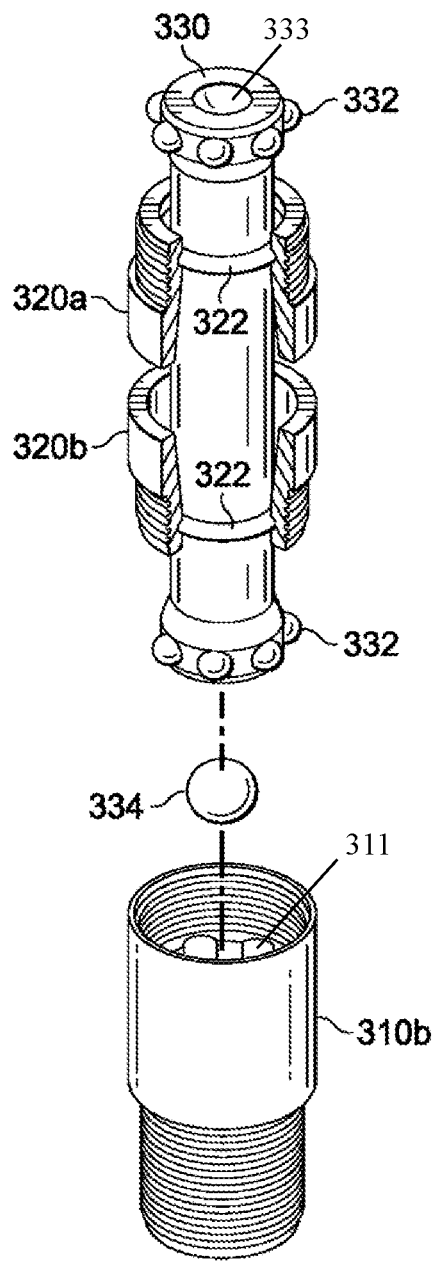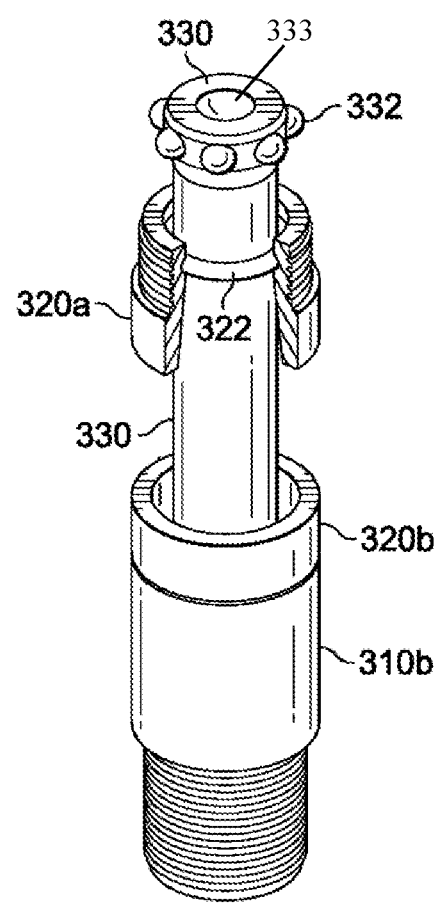
FIG. 8E
FIG. 8F

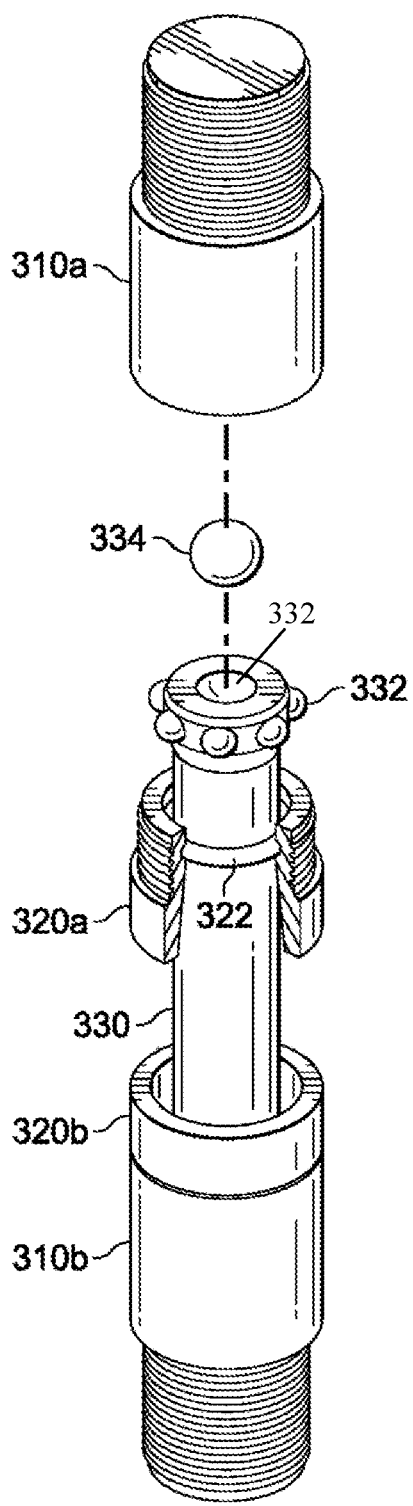
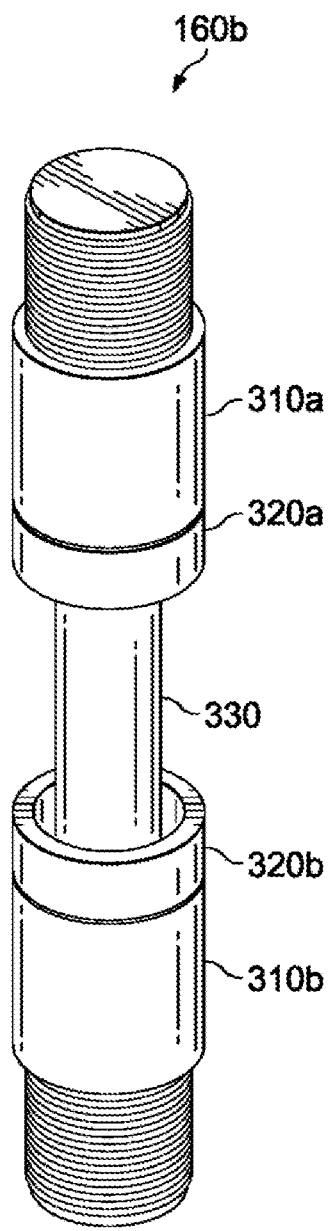
FIG. 8G  FIG. 8H

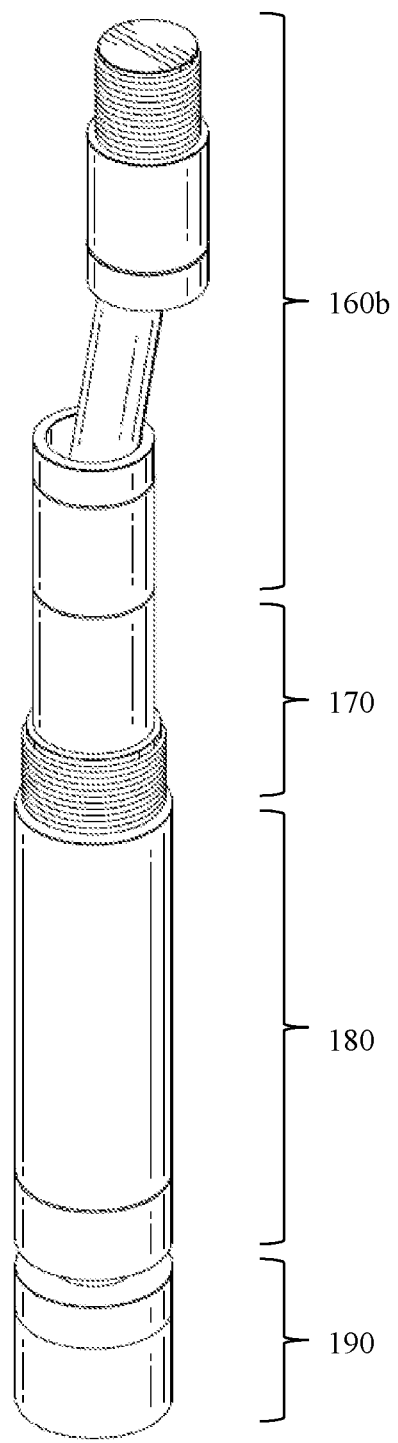
FIG. 9

DRIVE SHAFT ASSEMBLY

CROSS-REFERENCE TO RELATED APPLICATIONS

This application is a continuation of PCT International Application PCT/US2015/030430, filed on May 12, 2015, which is hereby incorporated by reference in its entirety.

BACKGROUND OF THE INVENTION

Hydrocarbon exploration includes drilling operations that seek to recover hydrocarbon deposits from below the Earth's surface. Typically, a drilling rig is used to drill a wellbore (straight and/or directional) that provides access to a subsurface formation. In addition, a drilling rig may be used to stimulate an existing well and gain access to more remote subsurface formations. Hydraulic fracturing is an example of an effective well-stimulation technique in which a geologic formation is hydraulically fractured by a high-pressure fluid to extract the hydrocarbon deposits disposed therein.

Conventional drilling methods include the use of a top drive, or rotary table, drilling system that is configured to rotate a drill string and a drill bit from the surface or the use of a hydraulic drilling system that is configured to rotate a drill bit downhole using hydrostatic pressure. In certain applications, more than one drilling method may be used at different times during the course of drilling operations. For example, a top drive drilling system may be used to establish a substantially vertical wellbore and a hydraulic drilling system may be used as part of slide drilling operations to drill in a directional manner. Because of advances in directional drilling and well-stimulation techniques, more remote subsurface formations are now accessible for hydrocarbon recovery.

A conventional hydraulic drilling system includes a hydraulic power section, sometimes referred to as a mud motor, which is disposed downhole to convert hydraulic energy from drilling fluid and/or drilling mud into mechanical energy that rotates a drill bit. A conventional mud motor uses a Moineau progressive cavity positive displacement pump system that typically includes a helical rotor inserted into a double helix stator. The interference fit between the rotor and the stator forms a number of sealed cavities. As fluid enters a cavity formed at an inlet, hydrostatic pressure forces the fluid through the cavities toward an outlet and rotates the rotor eccentrically within the stator. The eccentric rotation of the rotor is transferred to the drill bit by a drive shaft assembly that seeks to reduce or eliminate eccentricity while transferring torque to the drill bit.

BRIEF SUMMARY OF THE INVENTION

According to one aspect of one or more embodiments of the present invention, a drive shaft assembly includes a drive shaft comprising a first cylindrical end having a first diameter, a cylindrical portion having a second diameter, and a second cylindrical end having the first diameter. A first distal end of the drive shaft includes a first distal spherical indentation and a second distal end of the drive shaft includes a second distal spherical indentation. A first adapter cap includes a first tapered inner aperture and a first seal disposed within a first groove formed in a circumference of the first tapered inner aperture. The first tapered inner aperture is configured to receive the first cylindrical end of the drive shaft and the first seal forms a seal with the cylindrical portion of the drive shaft having the second diameter. A first adapter includes a first distal spherical indentation. A first distal spherical ball is removably attached to the first distal spherical indentation of the first adapter. A second adapter cap includes a second tapered inner aperture and a second seal disposed within a second groove formed in a circumference of the second tapered inner aperture. The second tapered inner aperture is configured to receive the second cylindrical end of the drive shaft and the second seal forms a seal with the cylindrical portion of the drive shaft having the second diameter. A second adapter includes a second distal spherical indentation. A second distal spherical ball is removably attached to the second distal spherical indentation of the second adapter.

Other aspects of the present invention will be apparent from the following description and claims.

BRIEF DESCRIPTION OF THE DRAWINGS

FIG. 1 shows a schematic view of a hydraulic drilling system in accordance with one or more embodiments of the present invention.

FIG. 2A shows an assembled view of a conventional drive shaft assembly.

FIG. 2B shows an exploded view of the conventional drive shaft assembly.

FIG. 3A shows a first step of a method of assembling a conventional drive shaft assembly.

FIG. 3B shows a second step of a method of assembling a conventional drive shaft assembly.

FIG. 3C shows a third step of a method of assembling a conventional drive shaft assembly.

FIG. 3D shows a fourth step of a method of assembling a conventional drive shaft assembly.

FIG. 3E shows a fifth step of a method of assembling a conventional drive shaft assembly.

FIG. 3F shows a sixth step of a method of assembling a conventional drive shaft assembly.

FIG. 3G shows a seventh step of a method of assembling a conventional drive shaft assembly.

FIG. 3H shows an eighth step of a method of assembling a conventional drive shaft assembly.

FIG. 3I shows a ninth step of a method of assembling a conventional drive shaft assembly.

FIG. 4A shows an assembled view of a drive shaft assembly in accordance with one or more embodiments of the present invention.

FIG. 4B shows an exploded view of the drive shaft assembly in accordance with one or more embodiments of the present invention.

FIG. 4C shows a cross-sectional view of an assembled drive shaft assembly in accordance with one or more embodiments of the present invention.

FIG. 5A shows a bottom perspective view of an adapter of a drive shaft assembly in accordance with one or more embodiments of the present invention.

FIG. 5B shows a top perspective view of the adapter of the drive shaft assembly in accordance with one or more embodiments of the present invention.

FIG. 5C shows a side view of the adapter of the drive shaft assembly in accordance with one or more embodiments of the present invention.

FIG. 5D shows a top view of the adapter of the drive shaft assembly in accordance with one or more embodiments of the present invention.

FIG. 6A shows a bottom perspective view of an adapter cap of a drive shaft assembly in accordance with one or more embodiments of the present invention.

FIG. 6B shows a top perspective view of the adapter cap of the drive shaft assembly in accordance with one or more embodiments of the present invention.

FIG. 6C shows a side view of the adapter cap of the drive shaft assembly in accordance with one or more embodiments of the present invention.

FIG. 6D shows a cross-section side view of the adapter cap of the drive shaft assembly in accordance with one or more embodiments of the present invention.

FIG. 7A shows a perspective view of a drive shaft of a drive shaft assembly in accordance with one or more embodiments of the present invention.

FIG. 7B shows a side view of a drive shaft of a drive shaft assembly in accordance with one or more embodiments of the present invention.

FIG. 7C shows a top view of a drive shaft of a drive shaft assembly in accordance with one or more embodiments of the present invention.

FIG. 7D shows a bottom view of a drive shaft of a drive shaft assembly in accordance with one or more embodiments of the present invention.

FIG. 8A shows a first step of a method of assembling a drive shaft assembly in accordance with one or more embodiments of the present invention.

FIG. 8B shows a second step of a method of assembling a drive shaft assembly in accordance with one or more embodiments of the present invention.

FIG. 8C shows a third step of a method of assembling a drive shaft assembly in accordance with one or more embodiments of the present invention.

FIG. 8D shows a fourth step of a method of assembling a drive shaft assembly in accordance with one or more embodiments of the present invention.

FIG. 8E shows a fifth step of a method of assembling a drive shaft assembly in accordance with one or more embodiments of the present invention.

FIG. 8F shows a sixth step of a method of assembling a drive shaft assembly in accordance with one or more embodiments of the present invention.

FIG. 8G shows a seventh step of a method of assembling a drive shaft assembly in accordance with one or more embodiments of the present invention.

FIG. 8H shows a eighth step of a method of assembling a drive shaft assembly in accordance with one or more embodiments of the present invention.

FIG. 9 shows a portion of a bottom hole assembly in accordance with one or more embodiments of the present invention.

DETAILED DESCRIPTION OF THE INVENTION

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention. In certain figures, small numerals "1" and "2" are used to denote first and second ends of various components to aid in the understanding of the written description.

FIG. 1 shows a schematic view of a hydraulic drilling system, or rig, 100 in accordance with one or more embodiments of the present invention. For purposes of illustration only, a coiled tubing rig 100 is depicted in FIG. 1. Coiled tubing rig 100 may be used in various applications including, for example, drilling operations, well stimulation including hydraulic fracturing, well intervention, and repair and remediation work. One of ordinary skill in the art will recognize that other types of hydraulic drilling systems (not shown) may be used in accordance with one or more embodiments of the present invention.

Coiled tubing rig 100 includes a sufficient length of tubing 130 spooled on a coiled tubing reel 110 that is disposed above the surface 103. A first end (not shown) of tubing 130 remains disposed above the surface 103 and is in fluid communication with a fluid source (not shown) that provides drilling fluid and/or drilling mud (not shown) under pressure. A second end (not shown) of tubing 130 is disposed downhole 105 and is in fluid communication with a bottom hole assembly ("BHA") 195 that receives the drilling fluid and/or drilling mud (not shown) provided from the surface 103. An injector head 120 may be used to push and/or pull the tubing 130 into or out of wellbore 105 to position the BHA 195 in a desired location.

BHA 195 typically includes top sub 140, hydraulic power section 150, drive shaft assembly 160, flow diverter 170, bearing assembly 180, and drill bit 190. Top sub 140 is a tubular connector that provides a fluid connection between tubing 130 and hydraulic power section 150. Hydraulic power section, or mud motor, 150 uses the hydrostatic pressure of the drilling fluid and/or drilling mud (not shown) to provide eccentric rotation to drive shaft assembly 160. One of ordinary skill in the art will recognize that a given hydraulic power section 150 may vary based on one or more design characteristics such as, for example, the number of stages (not shown), the lobe ratio (not shown), the external diameter (not shown), the design of the rotor, and the design of the stator. In addition, one of ordinary skill in the art will also recognize that a given hydraulic power section 150 may vary in the rotational speed, torque, or amount of eccentricity it produces. Drive shaft assembly 160 reduces or eliminates the eccentricity of the hydraulic power section 150 and provides substantially concentric rotation to drill bit 190 via bearing assembly 180 and flow diverter 170. In this way, drive shaft assembly 160 transfers torque from the hydraulic power section 150 to the mandrel (not shown) of the bearing assembly 180 and, ultimately, the drill bit 190. Flow diverter 170 is disposed between drive shaft assembly 160 and bearing assembly 180 and provides an inlet for drilling fluid and/or drilling mud (not shown) to lubricate and cool the bearings (not shown) and the mandrel (not shown) of bearing assembly 180 during drilling operations.

FIG. 2A shows an assembled view of a conventional drive shaft assembly 160a. Conventional drive shaft assembly 160a includes, in part, first adapter 210a, first adapter cap 220a, drive shaft 230, second adapter cap 220b, and second adapter 210b. First adapter 210a is mechanically connected to a hydraulic power section (e.g., 150 of FIG. 1) and receives eccentric rotation from the hydraulic power section (e.g., 150 of FIG. 1). The rotation of first adapter 210a rotates drive shaft 230. The rotation of drive shaft 230 rotates second adapter 210b. The rotation of second adapter 210b rotates a flow diverter (e.g., 170 of FIG. 1) that rotates a mandrel (not shown) of a bearing assembly (e.g., 180 of FIG. 1) that in turn rotates a drill bit (e.g., 190 of FIG. 1). Because of the freedom of movement between first adapter 210a and drive shaft 230 and the freedom of movement between drive shaft 230 and second adapter 210b, the eccentric rotation of first adapter 210a is converted into substantially concentric rotation at second adapter 210b.

Continuing in FIG. 2B, an exploded view of the conventional drive shaft assembly 160a is shown. As noted above, conventional drive shaft assembly 160a includes first adapter 210a, first adapter cap 220a, drive shaft 230, second adapter cap 220b, and second adapter 210b. Conventional drive shaft assembly 160a also includes first beryllium copper cap 240a, first boot 250a, first split ring clamp 260a, a first plurality of spherical balls 232, a second plurality of spherical balls 232, second split ring clamp 260b, second boot 250b, and second beryllium copper cap 240b.

First beryllium copper cap 240a is a consumable component typically made of beryllium copper. First beryllium copper cap 240a is a substantially cylindrical member that has diameter and a height that allows first beryllium copper cap 240a to be inserted into a corresponding cavity of first adapter 210a that is configured to receive it. A first side of first beryllium copper cap 240a includes a flat surface that is in moveable contact with a flat surface (not shown) of the corresponding cavity of first adapter 210a. A second side of first beryllium copper cap 240a includes a spherical indentation (not shown) configured to receive a portion of a first spherical end of drive shaft 230. A spherical indentation is a portion of a spherical shape that lies above or below a given plane. In operation, first beryllium copper cap 240a tends to wear out over time giving rise to a variety of failure modes. As such, first beryllium copper cap 240a must be removed and replaced at regular intervals requiring the cessation of drilling operations, removal of the BHA from the wellbore, disassembly of the drive shaft assembly 160a, replacement of the first beryllium copper cap 240a, reassembly of the drive shaft assembly 160a, and redeployment of the BHA.

First boot 250a is another consumable component that is typically made of synthetic rubber or fluoropolymer elastomer. First boot 250a includes a first end having a flared aperture of a first diameter and a second end having an aperture of a second diameter. A portion of drive shaft 230 extends through the second aperture of first boot 250a and the first end of first boot 250a covers a portion of a first universal joint formed by the first adapter cap 220a, the first spherical end of drive shaft 230, the first plurality of spherical balls 232, the first beryllium copper cap 240a, and the first adapter 210a protecting the first joint from drilling fluid and/or drilling mud and other particulate matter. In this way, first boot 250a functions as a temporary seal that protects the first joint from contamination and retains the lubrication necessary for the functionality of the first joint. In operation, first boot 250a tends to deform and ultimately disintegrate allowing the first joint to become contaminated, lose lubrication, and ultimately fail. As such, first boot 250a must be removed and/or replaced at regular intervals requiring the cessation of drilling operations, removal of the BHA from the wellbore, disassembly of the drive shaft assembly 160a, replacement of the first boot 250a, reassembly of the drive shaft assembly 160a, and redeployment of the BHA.

First split ring clamp 260a is a retention member that is typically made out of a metal. First split ring clamp 260a includes a first end having a flared aperture of a first diameter and a second end having an aperture of a second diameter. The first end of first split ring clamp 260a wraps around the first end of first boot 250a within an inner diameter of first adapter cap 210a. The second end of first split ring clamp 260a is flush with an inner diameter of first adapter cap 220a and closes the clamp 260a when first adapter cap 220a is removably attached to first adapter 210a. First adapter cap 220a includes a first end (male threaded) configured to mate with a second end (female threaded) of first adapter 210a. The first end (male threaded) of first adapter 210a is connected to a hydraulic power section (e.g., 150 of FIG. 1).

Drive shaft 230 includes the first spherical end and a second spherical end. Around the circumference of the first spherical end, a first plurality of spherical indentations is formed that are configured to receive the first plurality of spherical balls 232. Around the circumference of the second spherical end, a second plurality of spherical indentations is formed that are configured to receive the second plurality of spherical balls 232.

Second beryllium copper cap 240b is a consumable component typically made of beryllium copper. Second beryllium copper cap 240b is a substantially cylindrical member that has diameter and a height that allows second beryllium copper cap 240b to be inserted into a corresponding cavity of second adapter 210b that is configured to receive it. A first side of second beryllium copper cap 240b includes a flat surface (not shown) that is in moveable contact with a flat surface of the corresponding cavity of second adapter 210b. A second side of second beryllium copper cap 240b includes a spherical indentation configured to receive a portion of a second spherical end of drive shaft 230. In operation, second beryllium copper cap 240b tends to wear out over time giving rise to a variety of failure modes. As such, second beryllium copper cap 240b must be removed and replaced at regular intervals requiring the cessation of drilling operations, removal of the BHA from the wellbore, disassembly of the drive shaft assembly 160a, replacement of the second beryllium copper cap 240b, reassembly of the drive shaft assembly 160a, and redeployment of the BHA.

Second boot 250b is another consumable component that is typically made of synthetic rubber or fluoropolymer elastomer. Second boot 250b includes a first end having a flared aperture of a first diameter and a second end having an aperture of a second diameter. A portion of drive shaft 230 extends through the second aperture of second boot 250b and the first end of second boot 250b covers a portion of a second universal joint formed by the second adapter cap 220b, the second spherical end of drive shaft 230, the second plurality of spherical balls 232, the second beryllium copper cap 240b, and the second adapter 210b protecting the second joint from drilling fluid and/or drilling mud and other particulate matter. In this way, second boot 250b functions as a temporary seal that protects the second joint from contamination and retains the lubrication necessary for the functionality of the second joint. In operation, second boot 250b tends to deform and ultimately disintegrate allowing the second joint to become contaminated, lose lubrication, and ultimately fail. As such, second boot 250b must be removed and/or replaced at regular intervals requiring the cessation of drilling operations, removal of the BHA from the wellbore, disassembly of the drive shaft assembly 160a, replacement of the second boot 250b, reassembly of the drive shaft assembly 160a, and redeployment of the BHA.

Second split ring clamp 260b is a retention member that is typically made out of metal. Second split ring clamp 260b includes a first end having a flared aperture of a first diameter and a second end having an aperture of a second diameter. The first end of second split ring clamp 260b wraps around the first end of second boot 250b within an interior diameter of second adapter 210b. The second end of second split ring clamp 260b is flush with second adapter cap 220b and closes the clamp 260b when second adapter cap 220b is removably attached to second adapter 210b. Second adapter cap 220b includes a first end (male threaded) configured to mate with a second end (female threaded) of second adapter 210b. The first end (male threaded) of second adapter 210b is connected to a bearing assembly (e.g., 180 of FIG. 1) by way of a flow diverter (e.g., 170 of FIG. 1).

FIGS. 3A through 3I shows a method of assembling a conventional drive shaft assembly 160a. In FIG. 3A, conventional drive shaft 230 includes a first spherical end and a second spherical end. Around the circumference of the first spherical end, a first plurality of spherical indentations is formed that are configured to receive a first plurality of spherical balls (232 of FIG. 2B). Around the circumference of the second spherical end, a second plurality of spherical indentations is formed that are configured to receive a second plurality of spherical balls (232 of FIG. 2B). The first and the second plurality of spherical indentations may be greased to help hold the first and the second plurality of spherical balls (232 of FIG. 2B) in place at a later time. Continuing in FIG. 3B, a first adapter cap 220a is disposed around a first end of drive shaft 230 and a second adapter cap 220b is disposed around a second end of drive shaft 230. The first adapter cap 220a and the second adapter cap 220b are positioned such that their male threaded ends are directed outward as shown in the figure. Continuing in FIG. 3C, a first boot 250a is pulled over the first spherical end of drive shaft 230 and a second boot 250b is pulled over the second spherical end of drive shaft 230. The first boot 250a and the second boot 250b are positioned such that their first flared apertures are directed outward towards the respective spherical ends of drive shaft 230 as shown in the figure. Pulling the first boot 250a and the second boot 250b over their respective spherical ends of drive shaft 230 is exceptionally difficult because the second ends of first boot 250a and second boot 250b have a diameter smaller than that of the spherical ends of drive shaft 230. In many instances, the boots are torn or otherwise damaged in attempting to pull them over their respective spherical ends of drive shaft 230.

Continuing in FIG. 3D, a first plurality of spherical balls 232 are removably attached to the first plurality of spherical indentations formed in the first spherical end of drive shaft 230 and a second plurality of spherical balls 232 are removably attached to the second plurality of spherical indentations formed in the second spherical end of drive shaft 230. A second beryllium copper cap 240b is disposed in a corresponding cavity of second adapter 210b as shown in the figure. The second spherical end of drive shaft 230 and the second plurality of spherical balls 232 removably disposed thereon are removably attached to second adapter 210b. The second spherical end of drive shaft 230 is oriented such that the second plurality of spherical balls 232 removably slides into position in the corresponding sidewall of second adapter 210b. Continuing in FIG. 3E, a second split ring clamp 260b is placed around the second boot 250b such that a first end having a flared aperture of a first diameter of second split ring clamp 260b is wrapped around the first end of second boot 250b within second adapter 210b. Continuing in FIG. 3F, a second adapter cap 220b is removably attached to second adapter 210b. As second adapter cap 220b is secured to second adapter 210b, second adapter cap 220b is flush with a second end of second split ring clamp 260b such that second split ring clamp 260b closes as second adapter cap 220b is removably attached to second adapter 210b.

Continuing in FIG. 3G, a first beryllium copper cap 240a is disposed in a corresponding cavity of first adapter 210a as shown in the figure. The first spherical end of drive shaft 230 and the first plurality of spherical balls 232 removably disposed thereon are removably attached to first adapter 210a. The first spherical end of drive shaft 230 is oriented such that the first plurality of spherical balls 232 removably slides into position in the corresponding sidewall of first adapter 210a. Continuing in FIG. 3H, a first split ring clamp 260a is placed around the first boot 250a such that a first end having a flared aperture of a first diameter of first split ring clamp 260a is wrapped around the first end of first boot 250a within first adapter 210a. Continuing in FIG. 3I, a first adapter cap 220a is removably attached to first adapter 210a. As first adapter cap 220a is secured to first adapter 210a, first adapter cap 220a is flush with a second end of first split ring clamp 260a such that first split ring clamp 260a closes as first adapter cap 220a is removably attached to first adapter 210a.

As noted above, in operation, the conventional drive shaft assembly is prone to failure. The first boot and the second boot tend to wear out with use, deform, and, in many instances, disintegrate. When the boots fail, the joints lose lubrication, become contaminated by the drilling fluid and/or drilling mud or other particulate matter, and tend to fail rather quickly. Failures relating to the drive shaft assembly can manifest themselves in a variety of ways negatively impacting its functionality as well as, for example, the functionality of the mandrel of the bearing assembly, the bearings of the bearing assembly, the radial bearing, and the drill bit itself. When there is a failure with any component of the BHA arising out of the failure of the conventional drive shaft assembly, the drilling operations must be stopped, the BHA must be removed from the wellbore, the various components of the BHA must be disassembled to determine the source of the failure, then the failed components must be repaired and/or replaced prior to redeploying the BHA and continuing drilling operations.

Accordingly, in one or more embodiments of the present invention an improved drive shaft assembly provides substantially similar functionality to that of a conventional drive shaft assembly in a manner that is more robust, less prone to failure, and capable of functioning for extended periods of time free from maintenance and/or service.

FIG. 4A shows an assembled view of a drive shaft assembly 160b in accordance with one or more embodiments of the present invention. Drive shaft assembly 160b may be used in place of, for example, a conventional drive shaft assembly 160a, thereby providing a number of advantages as noted herein by mere substitution. Drive shaft assembly 160b includes, in part, first adapter 310a, first adapter cap 320a, drive shaft 330, second adapter cap 320b, and second adapter 310b. First adapter 310a, first adapter cap 320a, drive shaft 330, second adapter cap 320b, and second adapter 310b are unibody components made out of a metal or a metal alloy. In certain embodiments, they are made out of 8620 alloy steel. In other embodiments, they may be made out of 9310 alloy steel. In still other embodiments, they may be made out of 4140 alloy steel with EN30B shafting. One of ordinary skill in the art will recognize that other metals or metal alloys may be used in accordance with one or more embodiments of the present invention. One of ordinary skill in the art will also recognize that the material composition may vary based on an application or design in accordance with one or more embodiments of the present invention. In certain embodiments, first adapter cap 320a may include threading configured for right hand tightening while second adapter cap 320b may include threading configured for left hand tightening. In this way, when the spherical rotates in a right hand direction, the components of the drive shaft assembly 160b tighten rather than loosen.

First adapter 310a is mechanically connected to a hydraulic power section (e.g., 150 of FIG. 1) and receives eccentric rotation from the hydraulic power section (e.g., 150 of FIG. 1). The rotation of first adapter 310a rotates drive shaft 330. The rotation of drive shaft 330 rotates second adapter 310b. The rotation of second adapter 310b rotates a flow diverter (e.g., 170 of FIG. 1) that rotates a mandrel (not shown) of a bearing assembly (e.g., 180 of FIG. 1) that in turn rotates a drill bit (e.g., 190 of FIG. 1). Because of the freedom of movement between first adapter 310a and drive shaft 330 and the freedom of movement between drive shaft 330 and second adapter 310b, the eccentric rotation of first adapter 310a is converted into substantially concentric rotation at second adapter 310b.

FIG. 4B shows an exploded view of the drive shaft assembly 160b in accordance with one or more embodiments of the present invention. As noted above, drive shaft assembly 160b includes first adapter 310a, first adapter cap 320a, drive shaft 330, second adapter cap 320b, and second adapter 310a. Drive shaft assembly 160b also includes first seal 322, first distal spherical ball 334, a first plurality of spherical balls 332, a second plurality of spherical balls 332, second distal spherical ball 334, and second seal 322.

FIG. 4C shows a cross-sectional view of an assembled drive shaft assembly 160b in accordance with one or more embodiments of the present invention.

FIGS. 5A through 5D show an adapter 310 of a drive shaft assembly (160b of FIGS. 4A and 4B) in accordance with one or more embodiments of the present invention. Adapter 310 is representative of first adapter 310a or second adapter 310b of FIGS. 4A and 4B. FIG. 5A shows a bottom perspective view of adapter 310. A first end of adapter 310 includes male threading formed around a portion of an outer circumference that is configured for removably attaching adapter 310 to, for example, a hydraulic power section (e.g., 150 of FIG. 1) or a flow diverter (e.g., 170 of FIG. 1) that includes a corresponding female threaded end.

Continuing in FIG. 5B, a top perspective view of adapter 310 is shown. A second distal end of adapter 310 includes a cavity (partially shown) that includes a patterned bottom (not shown), patterned inner sidewall (partially shown), and a female threading (partially shown) formed within an inner circumference near the top of the second end of adapter 310. The threading formed within the inner circumference near the top of the second end of adapter 310 may be used to removably attach an adapter cap (e.g., 320 of FIGS. 4A and 4B) that includes a male threaded end.

Continuing in FIG. 5C, a side view of the adapter 310 is shown. Continuing in FIG. 5D, a top view of the adapter 310 is shown. The interior of the cavity of adapter 310 (accessible via the second distal end), includes a ball cage formed by a plurality of cylindrical segments 311 formed in a sidewall of an inner circumference of the cavity. In certain embodiments, the ball cage may include seven cylindrical segments 311. In other embodiments, the ball cage may include six cylindrical segments 311. In still other embodiments, the ball cage may include five cylindrical segments 311. In still other embodiments, the ball cage may include a number of cylindrical segments 311 in a range between five and eight cylindrical segments 311. One of ordinary skill in the art will recognize that the number of cylindrical segments 311 used may vary based on an application or design.

In operation, the drive shaft (330 of FIG. 4B) includes a plurality of spherical indentations in which a plurality of spherical balls 332 are removably attached. When the drive shaft 330 and the plurality of spherical balls (332 of FIG. 4B) are inserted into the cavity of adapter 310, the balls (332 of FIG. 4B) are secured in place by the plurality of spherical indentations of drive shaft (330 of FIG. 4B) and the ball cage formed by the plurality of cylindrical segments 311. As such, the plurality of spherical balls (332 of FIG. 4B) provide the driving contact between the drive shaft (330 of FIG. 4B) and the adapter 310. Adapter 310 also includes a distal spherical indentation 312 formed in a distal bottom of the cavity of adapter 310. Distal spherical indentation 312 is configured to receive a spherical ball (334 of FIG. 4B) that may be secured in place by a corresponding spherical indentation formed in a distal end of the drive shaft (330 of FIG. 4B). Advantageously, the drive shaft (330 of FIG. 4B) may move more freely and without damage to, for example, a beryllium copper cap of a conventional drive shaft assembly. For example, as the drive shaft (330 of FIG. 4B) moves, it pivots around the spherical ball (334 of FIG. 4B) whereas in a conventional drive shaft assembly the movement of the spherical end of the conventional drive shaft imparts force on the beryllium cap causing it to deform.

FIGS. 6A through 6D show an adapter cap 320 of a drive shaft assembly (160b of FIGS. 4A and 4B) in accordance with one or more embodiments of the present invention. Adapter cap 320 is representative of first adapter cap 320a or second adapter cap 320b of FIGS. 4A and 4B. However, in certain embodiments, adapter cap 320a may include threading configured for right hand tightening and adapter cap 320b may include threading configured for left hand tightening (not independently illustrated) to promote tightening as the downhole spherical rotates in a right hand direction.

FIG. 6A shows a bottom perspective view of adapter cap 320. A first end of adapter cap 320 includes male threading formed around a portion of an outer circumference that is configured for removably attaching adapter cap 320 to an adapter (310 of FIGS. 4A through 5D). A groove (not independent illustrated) is formed on an interior circumference of the first end of adapter cap 320 and is configured to receive a seal 322. A first distal end of adapter cap 320 includes a first aperture of a first diameter. Continuing in FIG. 6B, a top perspective view of adapter cap 320 is shown. A second distal end of adapter cap 320 includes a second aperture of a second diameter that is larger than the first diameter of the first aperture. Continuing in FIG. 6C, a side perspective view of adapter 320 is shown. Continuing in FIG. 6D, a cross-sectional side view of adapter 320 is shown. As shown in the cross-section, the second diameter of the second aperture is larger than the first diameter of the first aperture, forming a tapered inner aperture. Seal 322 may be disposed in a groove (not shown) formed in a circumference of the inner aperture of the first end of adapter cap 320. In certain embodiments, seal 322 may be an o-ring comprised of a fluoropolymer. In other embodiments, seal 322 may be a cup seal. One of ordinary skill in the art will recognize that seal 322 may vary in accordance with one or more embodiments of the present invention.

FIGS. 7A through 7D show a drive shaft 330 of a drive shaft assembly (160b of FIGS. 4A and 4B) in accordance with one or more embodiments of the present invention. FIG. 7A shows a perspective view of drive shaft 330. Drive shaft 330 includes a first cylindrical end having a first diameter, a cylindrical portion having a second diameter smaller than the first diameter, and a second cylindrical end having the first diameter. The first cylindrical end of drive shaft 330 includes a first plurality of spherical indentations 331 formed in an outer circumference of the first end of drive shaft 330. The second cylindrical end of drive shaft 330 includes a second plurality of spherical indentations 331 formed in an outer circumference of the second end of drive shaft 330. In certain embodiments, each cylindrical end of drive shaft 330 may include seven spherical indentations 331. In other embodiments, each cylindrical end of drive shaft 330 may include six spherical indentations 331. In still other embodiments, each cylindrical end of drive shaft 330 may include five spherical indentations 331. In still other embodiments, each cylindrical end of drive shaft 330 may include a number of spherical indentations 331 in a range between five and eight spherical indentations 331. One of ordinary skill in the art will recognize that the number of spherical indentations 331 used may vary based on an application or design. Continuing in FIG. 7B, a side view of drive shaft 330 is shown. Drive shaft 330 may have a length and diameters that may vary based on an application or design. Continuing in FIG. 7C, a top view of a first distal end of drive shaft 330 is shown. The first distal end of drive shaft 330 includes a first distal spherical indentation 333. Continuing in FIG. 7D, a bottom view of a second distal end of drive shaft 330 is shown. The second distal end of drive shaft 330 includes a second distal spherical indentation 333.

FIGS. 8A through 8H shows a method of assembling a drive shaft assembly 160*b* in accordance with one or more embodiments of the present invention. In FIG. 8A, drive shaft 330 includes a first cylindrical end and a second cylindrical end that are substantially identical to one another. Around an outer circumference of the first cylindrical end, a first plurality of spherical indentations 331 is formed that are configured to receive a first plurality of spherical balls (332 of FIG. 4*b*). Around an outer circumference of the second cylindrical end, a second plurality of spherical indentations 331 is formed that are configured to receive a second plurality of spherical balls (332 of FIG. 4*b*). The first and the second plurality of spherical indentations 331 may be greased to help hold the first and the second plurality of spherical balls (332 of FIG. 4*b*) in place at a later time.

Continuing in FIG. 8B, a first adapter cap 320*a* may be disposed around a first end of drive shaft 330 and a second adapter cap 320*b* may be disposed around a second end of drive shaft 330. The first cylindrical end of drive shaft 330 extends through the tapered inner aperture of the first adapter cap 320*a*. The second cylindrical end of drive shaft 330 extends through the tapered inner aperture of the second adapter cap 320*b*. The first adapter cap 320*a* and the second adapter cap 320*b* are positioned such that their male threaded ends are directed outward as shown in the figure. Continuing in FIG. 8C, a first seal 322 may be disposed around the first end of drive shaft 330 and a second seal 322 may be disposed around the second end of drive shaft 330. In certain embodiments, the first and the second seals 322 may be formed by a cylindrical rubber member whose distal ends are glued together in place forming o-rings. In other embodiments, the first and the second seals 322 may be unibody members formed in the shape of o-rings. In still other embodiments, the first and the second seals 322 may be other type of seal. Continuing in FIG. 8D, the first and the second seals 322 may be pushed into their corresponding grooves in the first adapter cap 320*a* and the second adapter cap 320*b* respectively. In certain embodiments, the first and the second seals 322 may be pushed into place from the first aperture of the first ends of adapter caps 320*a* and 320*b*. In other embodiments, the first and the second seals 322 may be pushed into place from the second aperture of the second ends of adapter caps 320*a* and 320*b*. A first plurality of spherical balls 332 may be removably attached to the first plurality of spherical indentations 331 formed in the first end of drive shaft 330. A second plurality of spherical balls 332 may be removably attached to the second plurality of spherical indentations 331 formed in the second end of drive shaft 330. In certain embodiments, grease may be used to hold the spherical balls 332 in place during assembly and provide lubrication for the spherical balls 332 during use.

Continuing in FIG. 8E, a second distal spherical ball 334 may be removably attached to a second distal spherical indentation (312 of FIG. 5D) formed in second adapter 310*b*. The second end of drive shaft 330 and the second plurality of spherical balls 332 removably disposed thereon are removably attached to second adapter 310*b* such that a second distal spherical indentation 333 of drive shaft 330 is in movable contact with second distal spherical ball 334 and the second plurality of spherical balls 332 removably slide into position in the corresponding sidewall of second adapter 310*b*. When the drive shaft 330 and the second plurality of spherical balls 332 are inserted into the cavity of second adapter 310*b*, the second distal spherical ball 333 is secured in place by the second distal spherical indentation 333 of drive shaft 330 and the second distal spherical indentation 312 of second adapter 310*b*. In addition, the plurality of spherical balls 332 are secured in place by the plurality of spherical indentations 331 of drive shaft 330 and the ball cage formed by the plurality of cylindrical segments 311. As such, the plurality of spherical balls 332 provides the driving contact between the drive shaft 330 and the second adapter 310*b*. Continuing in FIG. 8F, second adapter cap 320*b* may be removably attached to second adapter 310*b*. When second adapter cap 320*b* is secured to second adapter 310*b*, second seal 332 forms a seal around the second diameter of the drive shaft 330 such that the second end of drive shaft 330, the second plurality of spherical balls 332, the second distal spherical ball 334, and the cavity of adapter 310*b* is sealed, retains any lubrication disposed therein, and prevents drilling fluid and/or drilling mud from entering the sealed cavity.

Continuing in FIG. 8G, a first distal spherical ball 334 may be removably attached to a first distal spherical indentation (312 of FIG. 5D) formed in first adapter 310*a*. The first end of drive shaft 330 and the first plurality of spherical balls 332 removably disposed thereon may be removably attached to first adapter 310*a* such that a first distal spherical indentation 333 of drive shaft 330 is in movable contact with first distal spherical ball 334 and the first plurality of spherical balls 332 removably slide into position in the corresponding sidewall of first adapter 310*a*. When the drive shaft 330 and the first plurality of spherical balls 332 are inserted into the cavity of first adapter 310*a*, the first distal spherical ball 334 is secured in place by the first distal spherical indentation 333 of drive shaft 330 and the first distal spherical indentation 312 of first adapter 310*a*. In addition, the plurality of spherical balls 332 are secured in place by the first plurality of spherical indentations 331 of drive shaft 330 and the ball cage formed by the plurality of cylindrical segments 311. As such, the first plurality of spherical balls 332 provides the driving contact between the drive shaft 330 and the first adapter 310*a*. Continuing in FIG. 8H, first adapter cap 320*a* may be removably attached to first adapter 310*a*. When first adapter cap 320*a* is secured to first adapter 310*a*, first seal 332 forms a seal around the second diameter of the drive shaft 330 such that the first end of drive shaft 330, the first plurality of spherical balls 332, the first distal spherical ball 334, and the cavity of adapter 310*a* is sealed, retains any lubrication disposed therein, and prevents drilling fluid and/or drilling mud from entering the sealed cavity.

FIG. 9 shows a portion of a bottom hole assembly in accordance with one or more embodiments of the present invention. A portion of bottom hole assembly (e.g., 195 of FIG. 1) may include a drive shaft assembly 160*b*, a flow diverter 170, a bearing assembly 180, and a drill bit 190. A housing that covers the drive shaft assembly 160*b* and flow diverter 170 is not shown to illustrate how the drive shaft assembly 160*b* has freedom of movement that reduces or eliminates eccentricity.

Advantages of one or more embodiments of the present invention may include one or more of the following:

In one or more embodiments of the present invention, a drive shaft assembly may be used in place of a conventional drive shaft assembly.

In one or more embodiments of the present invention, a drive shaft assembly provides at least the same level of performance as that of a conventional drive shaft assembly and in many instances improved performance.

In one or more embodiments of the present invention, a drive shaft assembly includes a unique design for an adapter that includes a cavity that includes a distal spherical indentation. A distal spherical ball disposed in the distal spherical indentation provides a pivot point around which a drive shaft may move. Because of the freedom of movement and the lack of a beryllium copper cap, there is no consumable part in the adapter cap.

In one or more embodiments of the present invention, a drive shaft assembly includes a unique design for a drive shaft having a first diameter along a substantial length and a first end and a second end that each have a second diameter that is larger than the first diameter. A first and a second distal end of the drive shaft includes a substantially flat surface that includes a first and a second distal spherical indentation. Because the drive shaft does not include a spherical end and instead relies on the drive shaft pivoting around distal spherical ball, the drive shaft does not damage, for example, a beryllium copper cap.

In one or more embodiments of the present invention, a drive shaft assembly includes a unique design for an adapter cap that includes a tapered inner aperture that includes a groove for a seal. The seal is sized such that it forms a seal with the second diameter of the drive shaft. The adapter cap with seal forms a tight seal with the drive shaft that retains any lubrication disposed therein and prevents drilling fluid and/or drilling mud from entering the sealed cavity. Advantageously, this design does not require the use of a consumable boot and allows for prolonged periods of use without maintenance or service.

In one or more embodiments of the present invention, a drive shaft assembly reduces the operating cost of a hydraulic drilling system. Conventional drive shaft assemblies are prone to failure. When a conventional drive shaft assembly fails, drilling operations must cease, the BHA must be removed from the wellbore, the drive shaft assembly must be disassembled and consumable parts must be repaired or replaced before it is reassembled and the BHA is redeployed. Because the drive shaft assembly of the claimed invention includes fewer parts overall and no consumable parts, the drive shaft assembly may be used for prolonged periods of time without maintenance or service.

In one or more embodiments of the present invention, a drive shaft assembly provides improved reliability over a conventional drive shaft assembly. The design of the drive shaft, adapter, and adapter cap of the drive shaft assembly forms a sealed cavity that retains any lubrication disposed therein and prevents drilling fluid and/or drilling mud from entering the sealed cavity. The tapered inner aperture of the adapter cap includes a seal disposed therein that forms a seal around a second diameter of the drive shaft. Unlike a boot of a conventional drive shaft assembly, the o-ring is not prone to failure and does not disintegrate. As such, the sealed cavity of the drive shaft assembly retains lubrication and prevents contamination by drilling fluid and/or drilling mud for substantially longer amounts of time allowing for prolonged use of drive shaft assembly in a way that a conventional drive shaft assembly cannot achieve.

In one or more embodiments of the present invention, a drive shaft assembly is easier to assemble than a conventional drive shaft assembly.

In one or more embodiments of the present invention, a drive shaft assembly is at or near cost parity with a conventional drive shaft assembly.

In one or more embodiments of the present invention, a size of the various components of a drive shaft assembly may vary based on an application or design.

In one or more embodiments of the present invention, a drive shaft assembly may be compatible with hydraulic drilling systems including, for example, a coiled tubing rig.

In one or more embodiments of the present invention, a drive shaft assembly may be compatible with top drive drilling systems.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A drive shaft assembly comprising:
a drive shaft comprising a first cylindrical end having a first diameter, a cylindrical portion having a second diameter, and a second cylindrical end having the first diameter, wherein a first distal end of the drive shaft includes a first distal spherical indentation and wherein a second distal end of the drive shaft includes a second distal spherical indentation;
a first adapter cap comprising a first tapered inner aperture and a first seal disposed within a first groove formed in a circumference of the first tapered inner aperture, wherein the first tapered inner aperture is configured to receive the first cylindrical end of the drive shaft and the first seal forms a seal with the cylindrical portion of the drive shaft having the second diameter;
a first adapter comprising a first distal spherical indentation;
a first distal spherical ball removably attached to the first distal spherical indentation of the first adapter;
a second adapter cap comprising a second tapered inner aperture and a second seal disposed within a second groove formed in a circumference of the second tapered inner aperture, wherein the second tapered inner aperture is configured to receive the second cylindrical end of the drive shaft and the second seal forms a seal with the cylindrical portion of the drive shaft having the second diameter;
a second adapter comprising a second distal spherical indentation; and
a second distal spherical ball removably attached to the second distal spherical indentation of the second adapter,
wherein the first and the second seal each comprise an o-ring composed of fluoropolymer.

2. The drive shaft assembly of claim 1, wherein the first cylindrical end of the drive shaft comprises a first plurality of spherical indentations formed in an outer circumference of the first cylindrical end.

3. The drive shaft assembly of claim 2, wherein the first plurality of spherical indentations comprises seven spherical indentations.

4. The drive shaft assembly of claim 2, wherein the first adapter comprises a first plurality of cylindrical segments formed in a sidewall of an inner circumference of a cavity of the first adapter.

5. The drive shaft assembly of claim 4, wherein the first cylindrical end of the drive shaft extends through the tapered inner aperture of the first adapter cap.

6. The drive shaft assembly of claim 5, wherein a first plurality of spherical balls are removably attached to the first plurality of spherical indentations.

7. The drive shaft assembly of claim 6, wherein the first cylindrical end of the drive shaft and the removably attached first plurality of spherical balls are inserted into the first adapter.

8. The drive shaft assembly of claim 7, wherein the first distal spherical indentation of the drive shaft movably contacts the first distal spherical ball removably attached to the first distal spherical indentation of the first adapter.

9. The drive shaft assembly of claim 8, wherein the first adapter cap removably attaches to the first adapter and secures the first cylindrical end of the drive shaft to the first adapter.

10. The drive shaft assembly of claim 1, wherein the second cylindrical end of the drive shaft comprises a second plurality of spherical indentations formed in an outer circumference of the second cylindrical end.

11. The drive shaft assembly of claim 10, wherein the second plurality of spherical indentations comprises seven spherical indentations.

12. The drive shaft assembly of claim 10, wherein the second adapter comprises a second plurality of cylindrical segments formed in a sidewall of an inner circumference of a cavity of the second adapter.

13. The drive shaft assembly of claim 12, wherein the second cylindrical end of the drive shaft extends through the tapered inner aperture of the second adapter cap.

14. The drive shaft assembly of claim 13, wherein a second plurality of spherical balls are removably attached to the second plurality of spherical indentations.

15. The drive shaft assembly of claim 14, wherein the second cylindrical end of the drive shaft and the removably attached second plurality of spherical balls are inserted into the second adapter.

16. The drive shaft assembly of claim 15, wherein the second distal spherical indentation of the drive shaft movably contacts the second distal spherical ball removably attached to the second distal spherical indentation of the second adapter.

17. The drive shaft assembly of claim 16, wherein the second adapter cap removably attaches to the second adapter and secures the second cylindrical end of the drive shaft to the second adapter.

* * * * *